June 30, 1970 W. BAUM 3,518,577
RADIATION PROTECTED CABLES
Filed July 25, 1969 2 Sheets-Sheet 1

INVENTOR
WALTER BAUM
BY
Philip S. Hilbert
ATTORNEY.

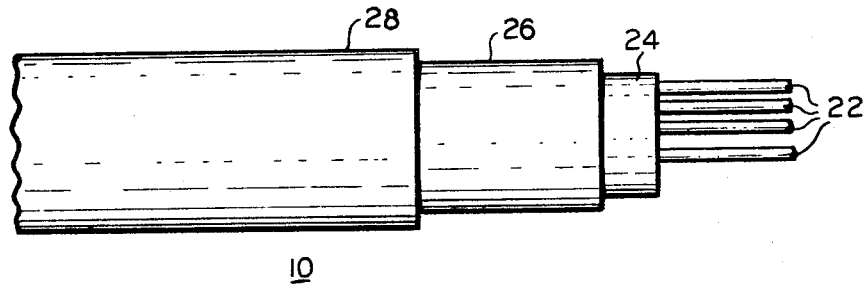
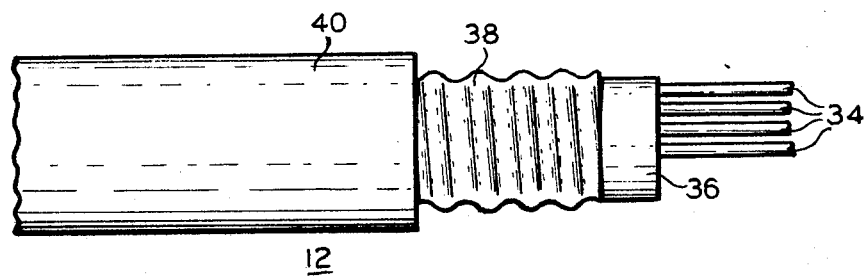
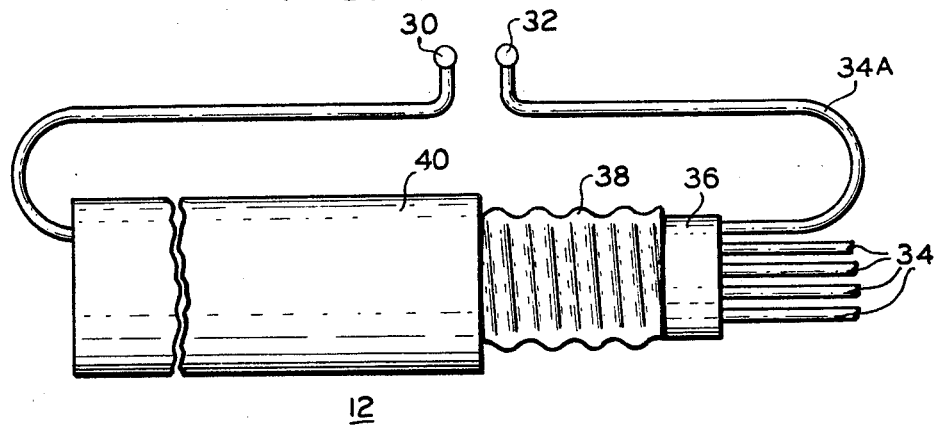

United States Patent Office 3,518,577
Patented June 30, 1970

3,518,577
RADIATION PROTECTED CABLES
Walter Baum, Nuremberg, Germany, assignor to Baum Elektrophysik G.m.b.H., Nuremberg, Germany, a corporation of Germany
Filed July 25, 1969, Ser. No. 844,889
Int. Cl. H04b 3/28
U.S. Cl. 333—12    11 Claims

ABSTRACT OF THE DISCLOSURE

A radiation protected communication cable having a portion which is armored or sheathed with ferrous metal over at least a part of its length, together with a conductor associated with one part of the cable and applied in a compensating phase to the other part of the cable which is so sheathed.

BACKGROUND OF THE INVENTION

This invention pertains to shielded cables and more particularly to signal carrying cables which are sheathed or armored over a portion of their length with ferrous metals.

When signal carrying or communication cables are run in proximity to high A.C. voltage cables, the signals radiated by the high A.C. voltage lines induce an interference voltage in the communication cable. Heretofore, lumped inductors were inverted in the communications cables and the interfering voltage was fed to the lumped inductors with suitable phasing to provide compensation. In such systems, the inductors, transformers, and amplifiers were large with respect to the cables unwieldly, difficult to mount and expensive.

It is an object of the present invention to dispense with the lumped inductors and transformers and to use distributed inductances and transformers which are already required portions of the communication cable.

Briefly the invention contemplates a communication cable that is armored or sheathed with ferrous metal over at least a part of its length wherein an interference signal picked up by a conductor associated with at least one portion of the cable, is applied in a compensating phase to the part of the cable which is sheathed with the ferrous metal.

Other objects, the features and advantages of the invention will be apparent from the following detailed description when read with the accompanying drawing wherein:

BRIEF DESCRIPTION OF THE DRAWINGS

FIG. 5 shows a portion of communication cable;

FIG. 6 shows another portion of cable which is sheathed with a ferrous metal; and FIG. 7 shows a variation of the cable of FIG. 6.

DESCRIPTION OF THE PREFERRED EMBODIMENTS

Figure 1:
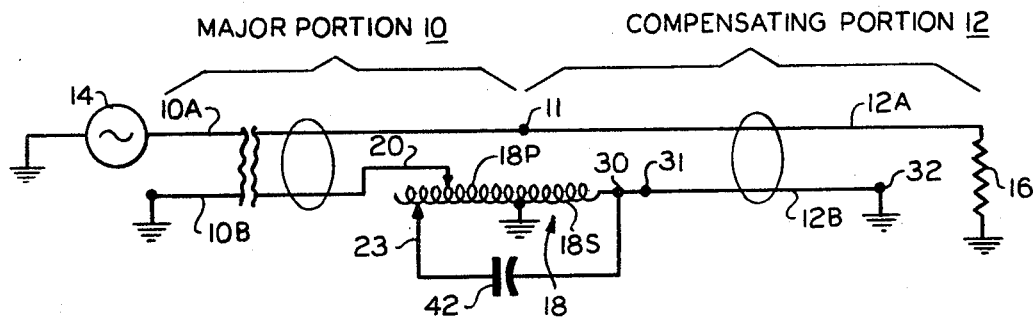
FIG. 1 shows schematically a first embodiment of a communication cable system incorporating the invention.

In FIG. 1 a communication cable comprising a major portion 10 and a compensating portion 12 connects a signal source 14 to a load 16. Major portion 10 is shown, schematically, including the communication signal conductor 10A connecting source 14 to junction 11 and the interference signal pickup conductor 10B, parallel thereto, having one end connected to ground and the other end connected to a variable tap 20 of winding 18B of transformer 18 whose other end is grounded. In FIG. 5 the major portion 10 of the communication cable is shown comprising a plurality of central conductors 22 embedded in insulating material 24 which is surrounded by a lead sheath 26 covered by a protective coating 28. According to one variation of major portion 10, all the central conductors 22 comprise the communication signal conductors 10A of FIG. 1 and the lead sheath 26 comprises the interference signal pickup conductor 10B. In another variation, all but one of the central conductors 22 comprises the communication signal conductor 10A and said one central conductor comprises the interference signal pickup conductor 10B.

Compensating portion 12 is shown schematically in FIG. 1 as comprising the communication signal conductor 12A connected between junction 11 and load 16, and compensating signal conductor 12B connected between terminal 31 connected to terminal 30 of the winding of transformer 18 whose other end is grounded, and grounded terminal 32. It should be noted the windings 18P and 18S of transformer 18 can be considered as a single winding with a grounded centertap.

In FIG. 7 the compensated portion is shown comprising central conductors 34 embedded in insulation 36, surrounded by a corrugation sheath 38 of iron or steel and covered by protective plastic coating 40. In one variation, all the central conductors 34 comprise the communication signal conductor 12A of FIG. 1, and sheath 38 is at most the compensating signal conductor 12B. In another variation, all but one of the central conductors 34 comprise the communication signal conductor 12A and said one central conductor 34A is the compensating signal conductor 12B (see FIG. 7). Furthermore, in the first variation, the central conductors act as the secondary winding of a compensating signal coupling transformer with sheath 38 acting as both the core and the primary winding of the transformer. In the second variation, the odd central conductor 34A is the primary winding, the sheath 38 the core, and the remaining central conductors 34 the secondary winding of the compensating signal coupling transformer.

To complete the description of FIG. 1 it should be noted that a phasing capacitor 42 connects variable tap 23 of winding 18P to terminal 30 of winding 18S.

In operation, comunication signals are fed from source 14, via conductors 10A and 12B, to load 16. Any interference signals picked up by conductor 10A will be picked up by conductor 10B. The picked up signals are fed via transformer 18 to conductor 12B and from there are transformer-coupled into conductor 12A. This transformer coupling arises because of the distributed transformer defined by sheath 38 and conductors 34 of the cable of FIG. 6, as previously described. The transformer 18 is effective to reverse the phase of the signal fed from conductor 10B to conductor 12B. The variable tap 20 is provided to adjust the amplitude of this signal while variable tap 23 and capacitor 42 are provided for phasing adjustments.

Figure 2:
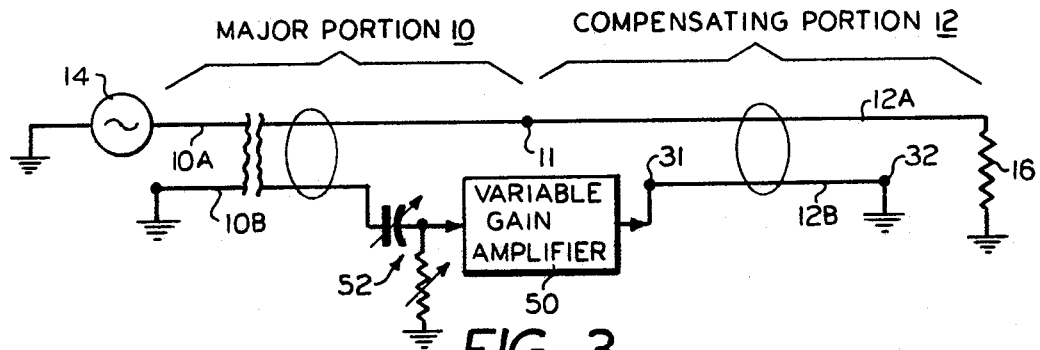
FIG. 2 shows another embodiment of the cable system of FIG. 1.

In FIG. 2, a variation of the system is shown. Here a variable-gain phase-inverting amplifier 50, whose input is connected to a variable phase network 52, is substituted for the transformer 18 and capacitor 42 of the system of FIG. 1. Except for this substitution the systems are quite similar and the same reference characters are used.

Figure 3:
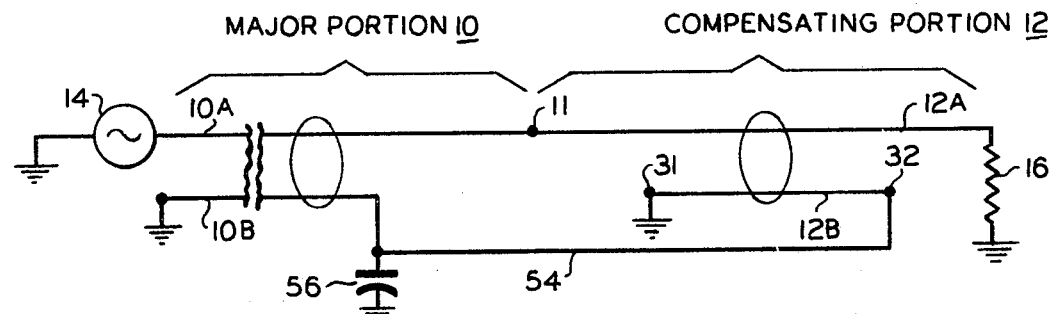
FIG. 3 shows a further embodiment of the cable system of FIG. 1.

In FIG. 3 there is shown a method of obtaining the phase inversion without the use of a phase inverting transformer such as transformer 18 of FIG. 1 or the phase inverting amplifier 50 of FIG. 2. In this case, the ungrounded end of signal pickup conductor 10B is connected, via a wire 54 (which is external to the sheath of the cable of compensating portion 12B), to the load end 32 of compensating signal conductor 12B, whose other end is grounded. Any adjustments in phasing can be made by including a phase adjusting capacitor 56 in series (or in parallel) with the loop comprising lead 54 and conductor 12B, the capacity of capacitor 56 and the inductance of conductor 12B forming an LC-element.

Figure 4:
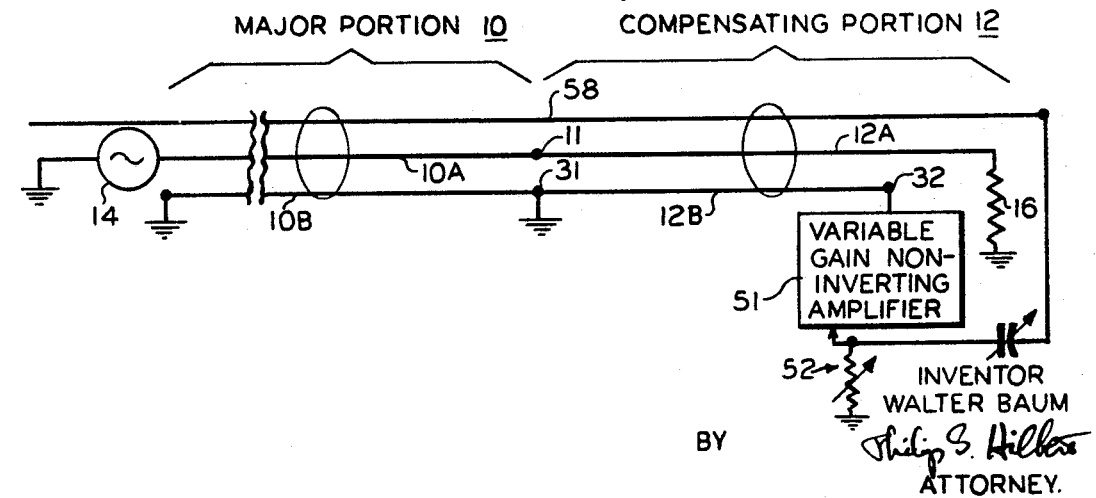
FIG. 4 shows a still further embodiment of the cable system of FIG. 1.

In FIG. 4, the pickup conductor 10B of major portion 10 and the compensating signal conductor 12B are directly connected together and grounded at point 31. Thus, a common cable such as preferably the cable of FIG. 6 can be used for the entire run with the sheath grounded at a point representing the start of the compensating portion. In addition, an interference signal pickup conductor will be one of the central conductors 34 extending over the entire length of the cable. The load end of this central conductor is connected via phase adjusting network 52 and variable-gain non-inverting amplifier 51 to the load end 32 of compensating signal conductor 12B which can be sheath 38 of the cable of FIG. 6 or central conductor 34A of FIG. 7, provided the point of central conductor 34A opposite point 31 is grounded. It should be noted, for this embodiment, that only a portion of the interference signal forms the basis for the compensating voltage, because there exists some feedback between the interfering signal and the compensating voltage so that only a residual portion of the interfering signal is picked up by conductor 58.

Since the function of transformer 18 of FIG. 1 is to adjust phase and amplitude, it can be made much smaller than the stepdown transformers used in previous compensating systems. The use of the ferrous sheath of the compensating portion as the core of the compensating transformer dispenses with the previously required lumped parametric compensating transformers.

When the communication cable has a ferrous metal sheath, the cable can be divided into sections wherein one section can serve as a compensating portion for a neighboring section.

What is claimed is:

1. A communications cable having a central signal conductor and a sheath of ferrous material over at least a given compensating portion of its length, an interference signal pickup conductor extending along at least a portion of the cable other than said given portion, and means for inductively applying the interference signal picked up by said pickup conductor as a compensating voltage in phase opposition to the central signal conductor of said given compensating portion through the agency of said sheath of ferrous material over at least said given compensating portion.

2. The communications cable of claim 1 wherein said compensating voltage is applied directly to said sheath over said given compensating portion whereby said sheath is both the primary winding and the core of a transformer and the central conductor within said sheath over said given compensating portion is the secondary winding of the transformer.

3. The communications cable of claim 1 wherein a further conductor is within the sheath over said given compensating portion and the compensating voltage is applied to said further conductor.

4. The communication cable of claim 1 wherein said sheath extends over the entire length of the cable and is divided into sections, one of said sections being the given compensating portion.

5. The communication cable of claim 1 wherein said inductively applying means includes a phase inverting transformer.

6. The communication cable of claim 5 wherein said phase inverting transformer includes a grounded center-tapped winding and tap means for adjusting the amplitude and phase of the compensating voltage.

7. The communication cable of claim 1 wherein said inductively applying means includes a phase inverting amplifier.

8. The communication cable of claim 7 wherein said phase inverting amplifier includes means for continuously varying the gain and phase shift thereof.

9. The communication cable of claim 2 wherein said inductively applying means includes an external conductor external to the sheath over said given compensating portion, said external conductor being connected to said interference pickup conductor and the sheath over said given compensating portion.

10. The communication cable of claim 3 wherein said inductively applying means includes an external conductor external to the sheath over said given compensating portion, said external conductor being connected to said interference pickup conductor and said further conductor.

11. The communication cable of claim 1 wherein said interference signal pickup conductor extends along the entire length of the cable.

References Cited
UNITED STATES PATENTS
955,142    4/1910    Davis _____ 333—12

ELI LIEBERMAN, Primary Examiner

M. NUSSBAUM, Assistant Examiner